United States Patent
Gottlieb et al.

(10) Patent No.: US 10,585,847 B2
(45) Date of Patent: Mar. 10, 2020

(54) SYSTEM AND METHOD FOR SCHEDULING INSTRUCTIONS IN A MULTITHREAD SIMD ARCHITECTURE WITH A FIXED NUMBER OF REGISTERS

(71) Applicant: ADVANCED MICRO DEVICES, INC., Santa Clara, CA (US)

(72) Inventors: Robert A. Gottlieb, Boxborough, MA (US); Christopher L. Reeve, Boxborough, MA (US); Michael John Bedy, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/266,863

(22) Filed: Feb. 4, 2019

(65) Prior Publication Data

US 2019/0179798 A1     Jun. 13, 2019

Related U.S. Application Data

(63) Continuation of application No. 15/191,374, filed on Jun. 23, 2016, now Pat. No. 10,198,259.

(51) Int. Cl.
    *G06F 15/80*    (2006.01)

(52) U.S. Cl.
    CPC ............... *G06F 15/8007* (2013.01)

(58) Field of Classification Search
    CPC .................................. G06F 15/8007
    USPC ....................................... 717/151
    See application file for complete search history.

(56) References Cited

U.S. PATENT DOCUMENTS

| 10,198,259 B2 * | 2/2019 | Gottlieb ............ G06F 15/8007 |
| 2012/0079503 A1 | 3/2012 | Dally et al. |
| 2013/0117734 A1 | 5/2013 | Kong et al. |

* cited by examiner

*Primary Examiner* — John Q Chavis
(74) *Attorney, Agent, or Firm* — Volpe and Koenig, P.C.

(57) ABSTRACT

A method and apparatus for scheduling instructions of a shader program for a graphics processing unit (GPU) with a fixed number of registers. The method and apparatus include computing, via a processing unit (PU), a liveness-based register usage across all basic blocks in the shader program, computing, via the PU, the range of numbers of waves of a plurality of registers for the shader program, assessing the impact of available post-register allocation optimizations, computing, via the PU, the scoring data based on number of waves of the plurality of registers, and computing, via the PU, the number of waves for execution for the plurality of registers.

20 Claims, 8 Drawing Sheets

SYSTEM AND METHOD FOR SCHEDULING INSTRUCTIONS IN A MULTITHREAD SIMD ARCHITECTURE WITH A FIXED NUMBER OF REGISTERS

CROSS REFERENCE TO RELATED APPLICATION

This application is a continuation of U.S. patent application Ser. No. 15/191,374, filed Jun. 23, 2016, which is incorporated by reference as if fully set forth.

TECHNICAL FIELD

The disclosed method and apparatus are generally directed to scheduling instructions in multithread devices, and in particular, to scheduling instructions in a multithread single instruction, multiple data (SIMD) architecture with a fixed number of registers.

BACKGROUND

Present solutions to scheduling instructions in a multithreaded SIMD architecture are generally performed on an individual basis. This means the basic block with the maximum number of registers sets the number of waves, independent of other basic blocks. If that basic block occurs late in the shader, then other preceding basic blocks cannot use the additional registers, and a basic block that uses a lot of registers cannot chose to schedule with fewer registers at a lower level of performance even if such a choice is warranted based on all basic blocks.

A shader is a program that is used to produce levels of color within an image including, but not limited to, position, hue, saturation, brightness, and contrast of pixels, for example. Shaders render effects on graphics hardware.

Shaders generally utilize parallel processing across a series of registers. The shader programs executed on a multithreaded SIMD machine, such as a graphics processors, need to balance maximum performance for a given shader program against maximum throughput for multiple simultaneous executing waves. An instruction scheduler is a part of a shader compiler targeted to generate code for such a machine. The instruction scheduler chooses the sequence of instructions in order to maximize performance. One tradeoff in instruction schedulers for multithreaded SIMD machines limited by a total number of registers is maximum performance for an individual shader program, with a corresponding typically larger number of registers, versus minimum register usage. That is, allowing maximum throughput for multiple shader programs by allowing more shader programs to execute simultaneously due to a reduction in register usage. In the case of these machines, there is a fixed number of registers that are allocated across multiple shader programs, so that the sum total of the registers required in all executing waves cannot exceed the total number of available registers on the machine.

For these machines, there is a fixed number of registers that are allocated across multiple shader programs. This means that shader programs with individual waves requiring a greater number of registers can execute fewer waves simultaneously. As memory latency for a wave is hidden in the execution of additional waves, restricting the number of waves by increasing the number of registers available to individual waves can require more waiting for memory operations to finish, thereby reducing performance.

BRIEF DESCRIPTION OF THE DRAWINGS

A more detailed understanding can be had from the following description, given by way of example in conjunction with the accompanying drawings wherein.

DETAILED DESCRIPTION

Typically, maximum performance for an individual shader program requires more registers. Maximum throughput can require more waves, each using fewer registers. Thus there is a need to improve the choice of the number of waves verses the number of registers for a given shader program.

A system and method for scheduling instructions of a shader program for a graphics processing unit (GPU) with a fixed number of registers is disclosed. The system and method include computing, via a processing unit (PU), a live variable analysis of the registers used by a shader program, computing, via the PU, a range of waves of the analyzed registers based on the live variable analysis of the registers, assessing, via the PU, an impact of the computed range of waves based on the computed range of wave of the analyzed registers, computing, via the PU, a score for the assessed impact of the computed range of waves, and computing, via the PU, the number of waves to execute for the registers used by the shader program based on the computed score.

A system and method is disclosed for scheduling instructions of a shader program for a graphics processing unit (GPU) with a fixed number of registers. The system and method include computing, via a processing unit (PU), a liveness-based register usage across all basic blocks for the shader program, computing, via the PU, the range of numbers of waves for a plurality of registers for the shader program, assessing the impact of available post-register allocation optimizations, computing, via the PU, the scoring data based on the number of waves, and computing, via the PU, the number of waves for the plurality of registers.

The computing a liveness-based register usage across all basic blocks in the shader program includes computing the minimum and maximum number of registers of the plurality of registers estimated for the shader program.

The computing the range of numbers of waves based on the plurality of registers for the shader program includes computing the minimum number of waves of the plurality of registers and the maximum numbers of waves of the plurality of registers for the shader program.

The assessing the impact of available post-register allocation optimizations includes computing the minimum number of waves of the plurality of registers for the shader program from the computed maximum number of registers of the plurality of registers.

The computing of the scoring data based on number of waves of the plurality of registers includes choosing the best scheduling algorithm based on the scores, including post-register allocation optimization and accumulating the information with the information for the number of waves of the plurality of registers for all basic blocks in the shader program.

The computing the number of waves of the plurality of registers includes choosing the number of waves, based on the best score for the accumulated data for the number of waves, and the best score for the accumulated data with post-register allocation optimizations, and choosing the number of registers of the plurality of registers used by the shader program based on the number of waves chosen.

Instruction scheduling in a multithread SIMD machine is described. This scheduling, for example, includes an implementation for scheduling instructions in a program for improved performance on a multithread SIMD machine where the number of waves is limited by a fixed total number of registers across all waves. The instruction scheduler examines each basic block, and generates a schedule for that basic block by choosing the best schedule from the results of several different scheduling paradigms. That schedule indicates the required number of registers, which in turn indicates the maximum number of waves that can execute simultaneously. If one basic block requires significantly more registers than the other basic blocks, that basic block can limit the number of waves based on that one basic block.

The instruction scheduler initially walks all the basic blocks in the shader program, and applies the different scheduling paradigms. Instead of generating a schedule for each basic block, information can be generated for the performance for the best schedule for a range of numbers of waves, and then merge that performance information across all the basic blocks in the shader program. This merged performance information is then used to select the optimum number of waves, and that in turn selects the number of registers available for each wave. The selected register counts are then supplied as limits to the instruction scheduler to permit optimum performance for scheduling the individual basic blocks.

Figure 1:
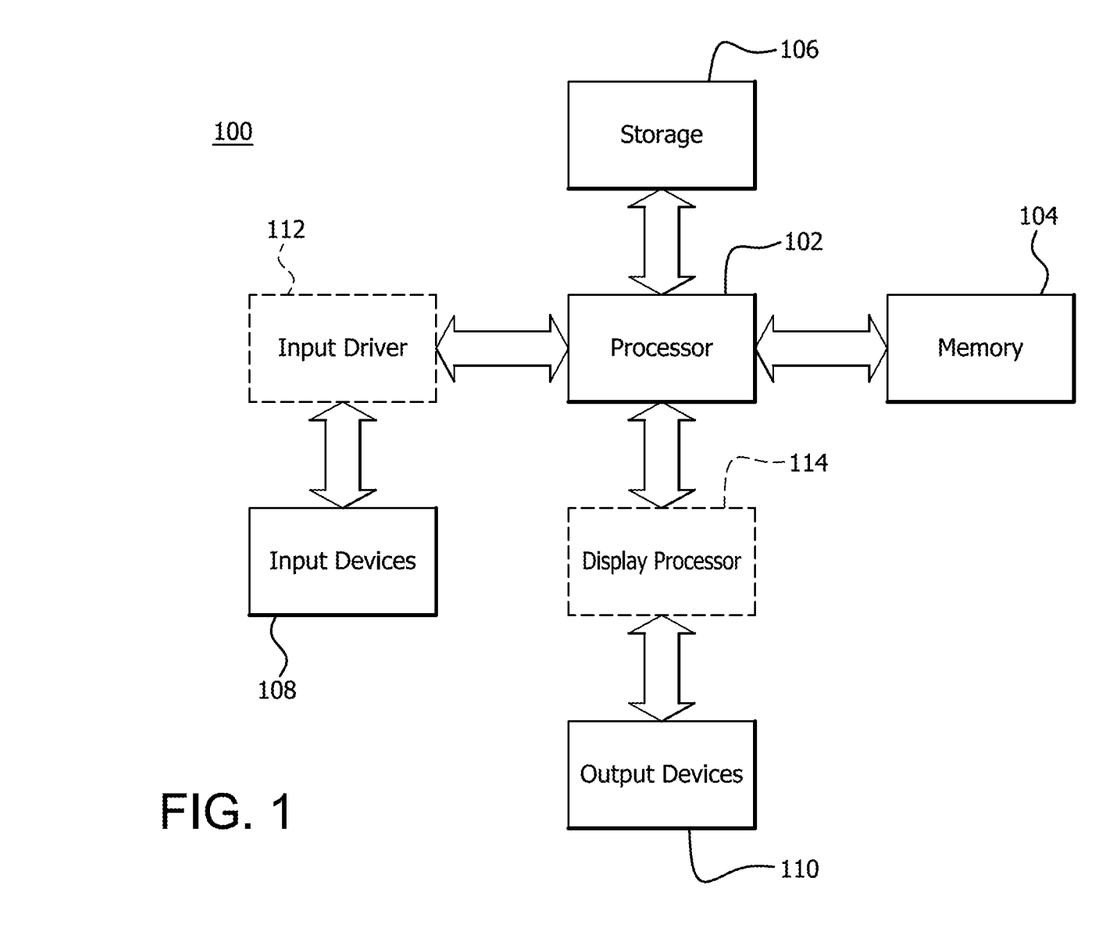
FIG. 1 is a block diagram of an example device in which one or more disclosed embodiments can be implemented.

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 can also optionally include an input driver 112 and a display processor 114. It is understood that the device 100 can include additional components not shown in FIG. 1.

The processor 102 can include a central processing unit (CPU), a graphics processing unit (GPU), a CPU and GPU located on the same die, or one or more processor cores, wherein each processor core can be a CPU or a GPU. Processor 102 can be a CPU, for example, and display processor 114 can be a GPU that can or cannot be on the same chip as processor 102, by way of non-limiting example. The memory 104 can be located on the same die as the processor 102, or can be located separately from the processor 102. The memory 104 can include a volatile or non-volatile memory, for example, random access memory (RAM), dynamic RAM, or a cache.

The storage device 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. Input driver 112 can be hardware, software, or a combination thereof. The display processor 114 communicates with the processor 102 and the output devices 110, and permits the processor 102 to send output to the output devices 110. It is noted that the input driver 112 and the display processor 114 are optional components, and that the device 100 will operate in the same manner if the input driver 112 and the display processor 114 are not present.

Figure 2:
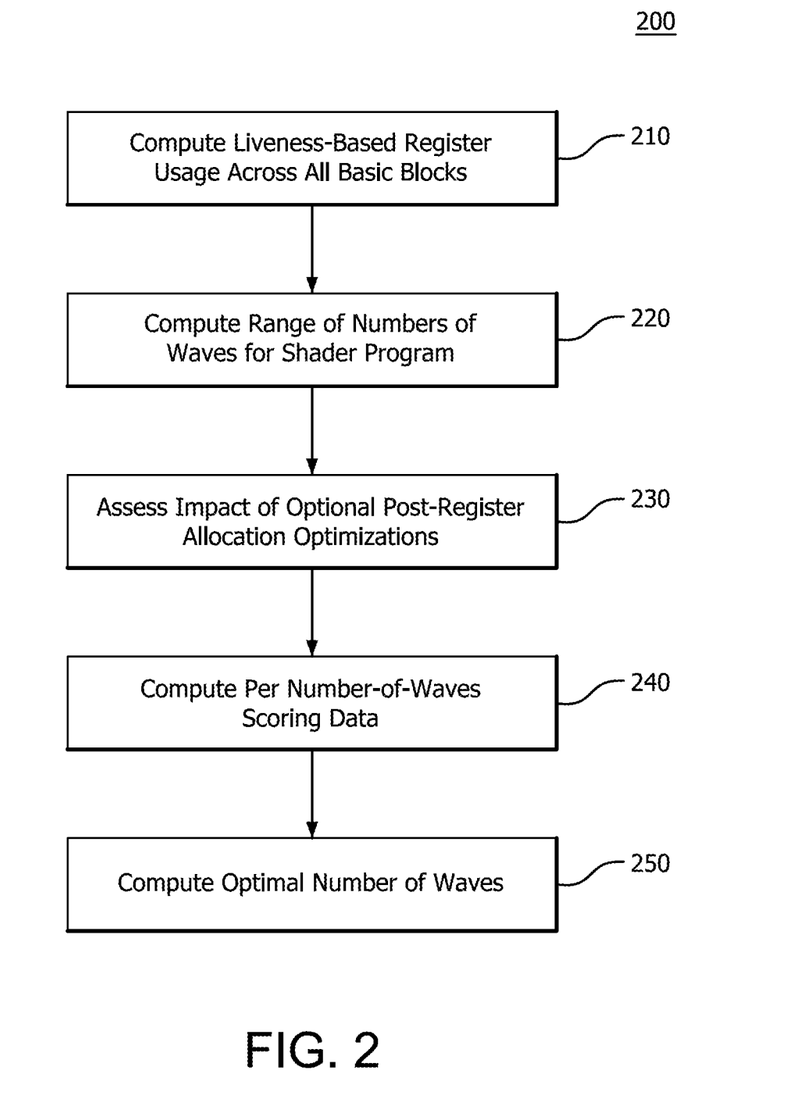
FIG. 2 is an illustration of a method for scheduling instructions in a multithread SIMD architecture with a fixed number of registers.

FIG. 2 is an illustration of a method 200 for scheduling instructions in a multithread SIMD architecture with a fixed number of registers. Method 200 includes determining the liveness-based register usage at step 210, determining the range of number of waves at step 220, assessing the impact of post-register allocation optimizations at step 230, computing the scoring data for each number of waves at step 240, and determining the number of waves at step 250.

Determining the liveness-based register usage at step 210 can be performed across the entire shader program. For example, this determination can compute where non-assigned registers start to be used and stop being used.

This determination 210 can include an analysis of each function in the shader program. This can be performed in a bottom-up walk, such that each function is examined before all its callers are examined. Recursion, i.e. cycles in the call graph, can be allowed in making determination 210.

An analysis of the variables that are live at the beginning of each basic block is computed within each function of the shader program. Then within each basic block within the function, different scheduling algorithms can be applied to each basic block. Information associated with the basic block can be determined and saved for later usage. Examples of the determined information can be any one or a combination of the following: some or all of the number of registers required or needed; the execution time required for different classes of instructions; the delay time required to wait for operations to complete; and other information.

Using this information for each scheduling algorithm applied to the basic block, the minimum and maximum number of registers needed can be computed from the number of registers required from all scheduling algorithms, i.e. minimum registers for basic block=minimum (number of registers across all scheduling algorithms).

The minimum number of registers required for a function can be computed by taking the maximum value of the minimum number of registers required for each basic block in the function. The maximum number of registers required for the function can be computed by taking the maximum value of the maximum number of registers required for each basic block in the function.

The minimum number of registers required for the shader program can be computed by taking the maximum of the minimum number of registers required for each function, and incorporating the additional registers needed to handle calling conventions.

The maximum number of registers required for the shader program can be computed by taking the maximum of the maximum number of registers required for each function, and incorporating the additional registers needed to handle calling conventions.

Determining the range of number of waves at step 220 can apply any additional effects to the number of required registers from step 210, such as physical register usage. This determining 220, or computing, can be based on the computed liveness-based register usage from step 210. Determining 220 can apply the effects of register allocation on the number of required registers. When the number of registers is close to or over the number of registers for a specific count of waves, a trade-off can be explored by increasing the number of waves by decreasing the number of registers used. All basic blocks in the shader program are analyzed. For each basic block, the number of registers can be computed as needed for the effects of register allocation, and that number can be used to compute the number of waves available for each of the scheduling algorithms. The minimum number of waves for the basic block can be computed from the minimum of the number of waves for each scheduling algorithm, and the maximum number of waves for the basic block can be computed from the maximum number of waves for each scheduling algorithm. For all basic blocks in the shader program, the minimum number of waves can be computed. For all basic blocks in the shader program, the maximum number of waves can be computed.

All basic blocks in the shader program can be analyzed. For each basic block, the number of registers can be computed as needed for the effects of register allocation, and that number can be used to compute the number of waves available for each of the scheduling algorithms. The minimum number of waves for the basic block is computed from the minimum of the number of waves for each scheduling algorithm, and the maximum number of waves for the basic block is computed from the maximum number of waves for each scheduling algorithm. For all basic blocks in the shader program, the minimum number of waves is computed. For all basic blocks in the shader program, the maximum number of waves is computed.

Assessing the impact of post-register allocation optimizations at step 230 can include estimating the number of registers required for the post-register allocation optimizations based on the computed range of numbers of waves of the registers from step 220. This estimation is performed for accuracy of the optimization performed later in method 200.

Assessing at step 230 can include determining if there are post-register allocation optimizations that apply. If there are, then if the minimum number of registers added to the additional number of registers required for the post-register allocator optimizations does not exceed the maximum number of registers available to the shader program, a computation can be made of the maximum number of waves from the minimum number of registers added to the additional number of registers required. This can then be used as the maximum number of waves.

If the maximum number of registers added to the additional number of registers required for the post-register allocator optimizations does not exceed the maximum number of registers available to the shader program, a computation can be made of the minimum number of waves from the maximum number of registers added to the additional number of registers required. This can be used as the minimum number of waves.

Computing the scoring data for each number of waves at step 240 can be based on the assessed impact of register allocation optimizations of step 230. Computing the scoring data 240 can include walking each basic block in the shader program to accumulate the range of the minimum to maximum number of waves the basic block's accumulated scoring data is examined for each scheduling algorithm. The best of these scores for each basic block can be accumulated over all the basic blocks in the shader program for a given number of waves. The best of these scores can be the highest outright score, for example. The best score can also be the highest score after accounting for biases in the outcome for example, such biases including a preference of using more registers, or less registers, by way of example. If there is a bias toward using more registers, if there are two scores that are approximately the same, although the scenario with fewer registers is actually a higher score, the scenario using more registers can be selected as the best. Additional scoring data can also be accumulated based on the impact of other optimizations that might be applied, given sufficient numbers of registers.

For example, after walking over the basic blocks, it can be determined that 3 waves provides a score of X in the performance metric and 4 waves provides a score of Y in the performance metric. The better one, either X or Y, accounting for biases in the outcome, can then be selected and either 3 or 4 waves selected therewith.

Figure 8:
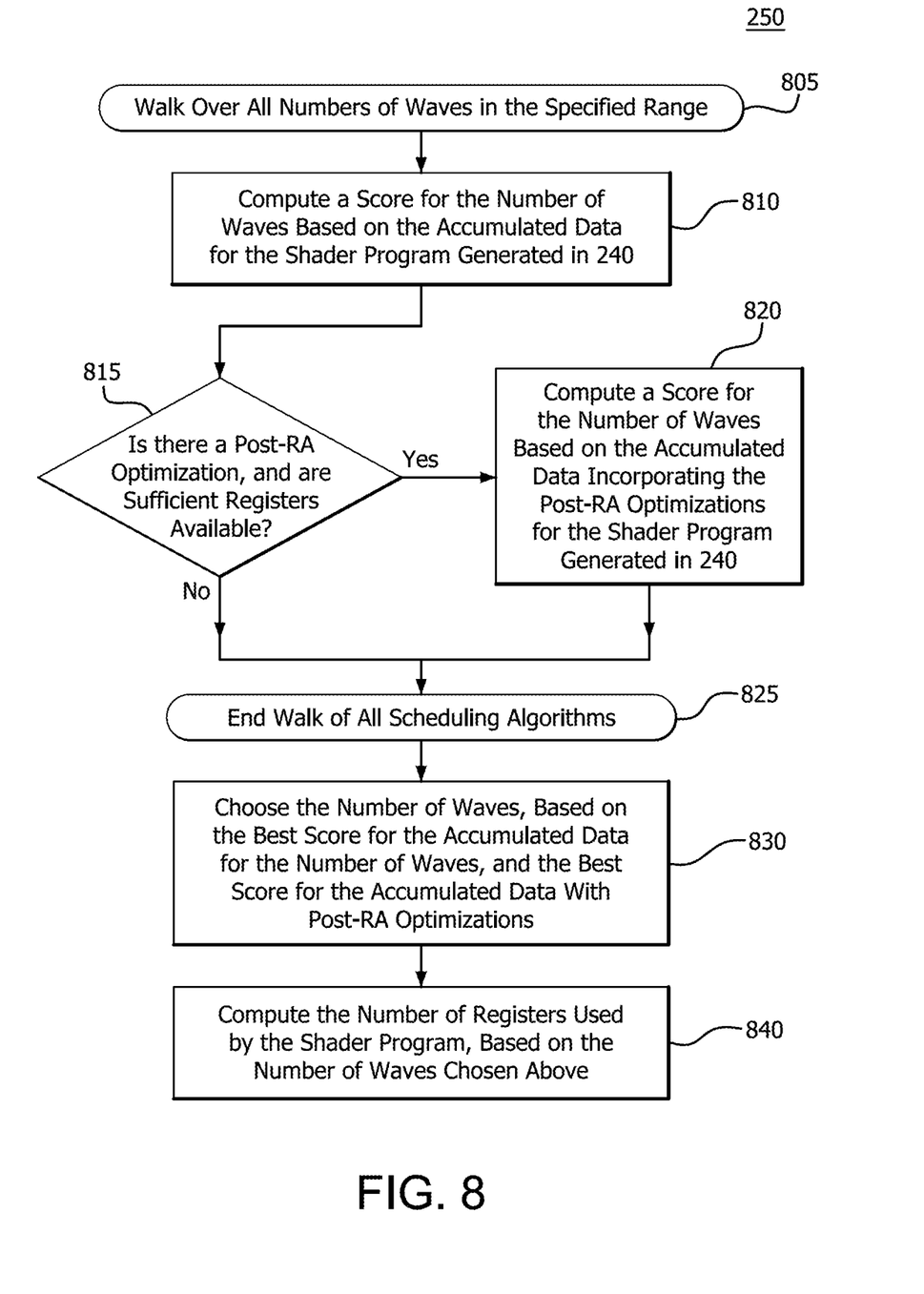
FIG. 8 is an illustration of a method for determining the number of waves for execution of FIG. 2.

Determining the number of waves at step 250 can rely on the accumulated scoring information from step 240 for the entire shader program for differing numbers of waves, and can include the estimated impact of other optimizations. This can include selecting the best performance metric, for example. Accounting for preferences and the like can also be included in the selection. As will be described in more detail and as shown in FIG. 8 below, this scoring data is examined, and a choice is made of the number of waves with the best accumulated score. This number of waves is then input to the instruction scheduler, so that the best choice of number of waves verses performance per wave is achieved.

Figure 3:
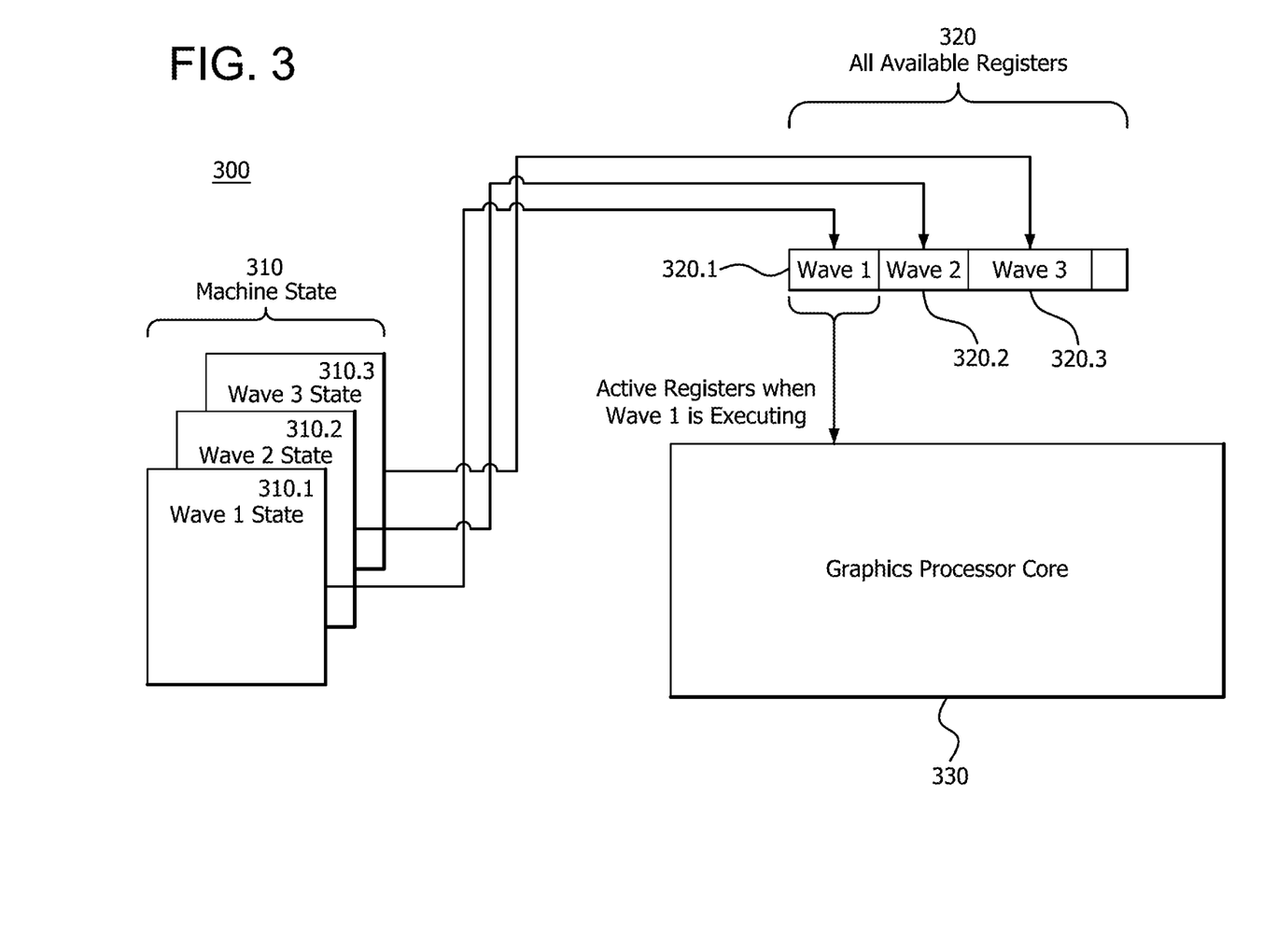
FIG. 3 is an illustration of a multithread SIMD device with a fixed number of registers on which the method of FIG. 2 can be performed.

FIG. 3 is an illustration of a system 300 on which the method 200 of FIG. 2 can be performed or performed in anticipation of scheduling the instructions on system 300. System 300 can include a graphics processor core, such as graphics processor core 330. System 300 includes a plurality of machine wave states 310, a plurality of registers 320, also known as a set of available registers, and graphics processor core 330. The plurality of machine wave states 310 can provide storage for information or processes to run on core 330. Plurality of machine wave states 310 can include the computer hardware devices used to store information for immediate use in a computer.

Plurality of registers 320 can be fast storage, including specific hardware functions, and can be read-only or write-only, for example. Registers 320 are normally at the top of the memory hierarchy, and provide the fastest way to access data with registers 320 being directly encoded as part of an instruction, as defined by the instruction set, for example.

Plurality of machine wave states 310 can include a first wave in a Wave 1 state 310.1, a second wave in a Wave 2 state 310.2, and a third wave in a Wave 3 state 310.3, for example. Wave states 310.1-3 can populate registers from the plurality of registers 320. For example, wave 1 state 310.1 can populate registers 320.1, wave 2 state 310.2 can populate registers 320.2 and wave 3 state 310.3 can populate registers 320.2. When wave 1 state 310.1 is executing via core 330 register 320.1 can be active. Similarly as wave 2 state 310.2 is executing via core 330 register 320.2 can be active, and as wave 3 state 310.3 is executing via core 330 register 320.3 can be active. In this example, the number of waves equals three. This is for ease of understanding and provides only one example. It is to be understood that any number of waves can be used. For example, some processors can employ ten waves or more.

Method 200 can be performed on system 300, by computing a liveness-based register 320 usage across all basic blocks of memory 310, computing the range of numbers of waves in memory 310 by loading into registers 320 for shader program, assessing the impact of available post-register allocation optimizations, computing the scoring data based on number of waves from registers 320; and computing the number of waves. As set forth herein, the number of waves is the number of waves that maximizes performance for an individual shader program while providing maximum throughput.

Figure 4:
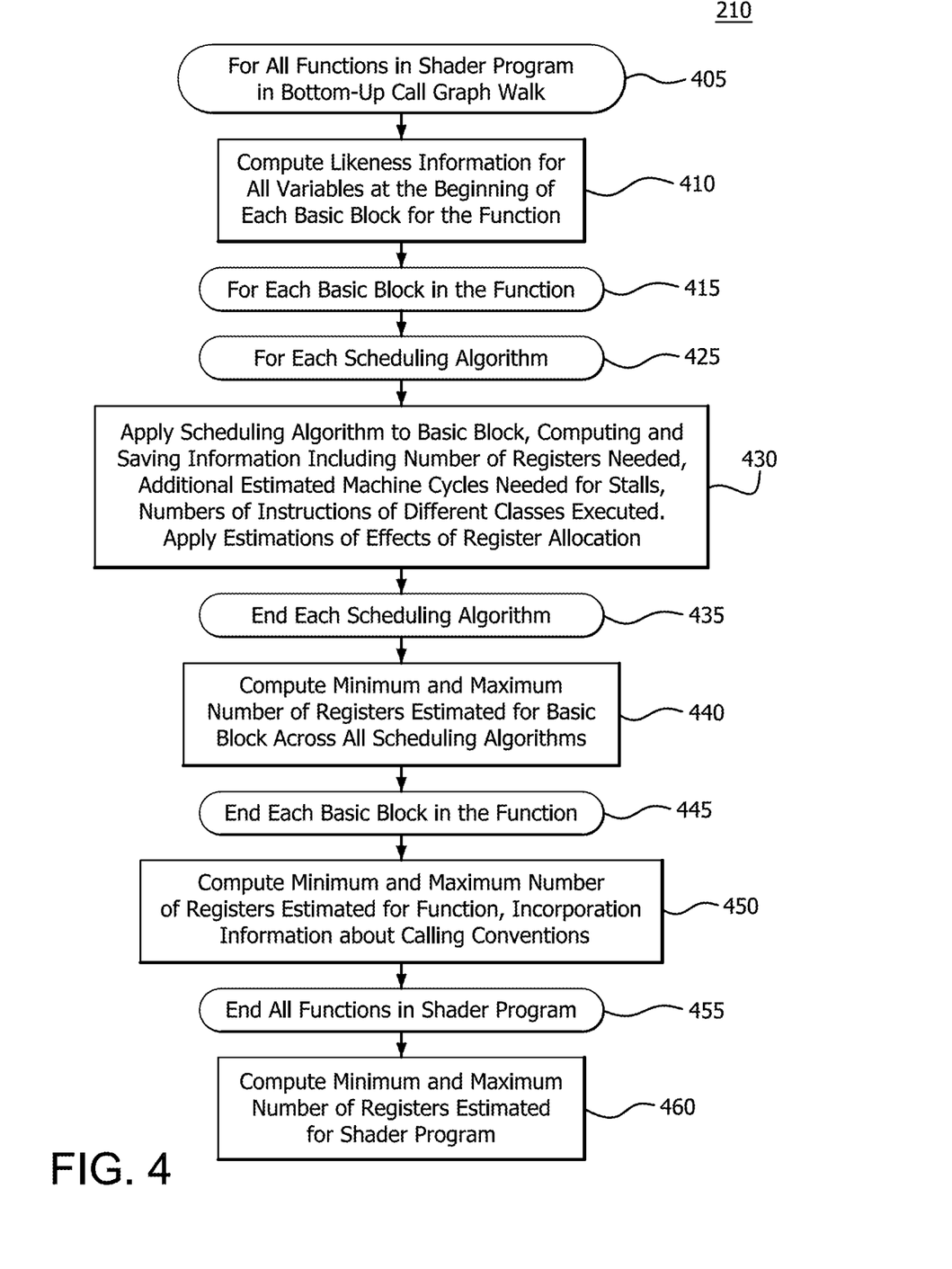
FIG. 4 is an illustration of a method for determining the liveness-based register usage of FIG. 2.

FIG. 4 is an illustration of a method for determining the liveness-based register usage as set forth in step 210 of FIG. 2. Determining the liveness-based register usage at step 210 can be performed across the entire shader program. This determination 210 can include an analysis of each function in the shader program at step 405. Such analysis can be performed in a bottom-up walk, such that each function is examined before all of its callers are examined. Recursion, such as repeating cycles in the call graph, can be allowed. This recursion can allow each function to be examined before all of its callers are examined, and recursively repeating functions.

Within each function of the shader program, an analysis of what variables are live at the beginning of each basic block is computed at step 410. In essence, if the variables are live at the beginning, these variables can, or should, be live at the end.

Then for each basic block within the function at step 415, different scheduling algorithms can be applied to that basic block at step 425. There can be a number of scheduling algorithms, and for each one the entire basic block can be analyzed.

Information including some or all of the number of registers required or needed can be determined, the execution time required for different classes of instructions, and the delay time required to wait for operations to complete, associated with the basic block can be determined and saved for later usage at step 430. The number of instructions of different classes executed can be the same for each block. A heuristic algorithm can be applied to the information to provide a range of registers based on the minimum number of registers and the maximum number of registers.

Each scheduling algorithm is completed at step 435. Using this information for each scheduling algorithm applied to the block, the minimum and maximum number of registers needed can be computed from the number of registers required from all scheduling algorithms at step 440. The minimum registers for basic block=minimum (number of registers across all scheduling algorithms).

$$minimum\ registers_{basic\ Block} = \left\lfloor \bigvee_{Scheduling\ Algorithms} number\ of\ registers \right\rfloor \quad \text{Eq. 1}$$

$$maximum\ registers_{Basic\ block} = \left\lceil \bigvee_{Scheduling\ Algorithms} number\ of\ registers \right\rceil \quad \text{Eq. 2}$$

Each basic block in the function can be completed at step 445. The minimum number of registers required for the function can be computed at step 450. This computation can take the maximum value of the minimum number of registers required for each basic block in the function.

$$minimum\ registers_{function} = \left\lceil \bigvee_{Basic\ Blocks\ in\ Function} minimum\ registers_{Basic\ Block} \right\rceil \quad \text{Eq. 3}$$

The maximum number of registers required for the function is computed at step 450. This computation can take the maximum value of the maximum number of registers required for each basic block in the function.

$$maximum\ registers_{function} = \left\lceil \bigvee_{Basic\ Blocks\ in\ Function} maximum\ registers_{Basic\ Block} \right\rceil \quad \text{Eq. 4}$$

All functions in the shader program can be completed at step 455. The minimum number of registers required for the shader program can be computed in step 460. The minimum number of registers can be computed by taking the maximum of the minimum number of registers required for each function, and incorporating the additional registers needed to handle calling conventions:

$$minimum\ registers_{Shader\ Program} = \left\lceil \bigvee_{Functions\ in\ Shader\ Program} minimum\ registers_{Function} + registers_{calling\ conventions} \right\rceil \quad \text{Eq. 5}$$

The maximum number of registers required for the shader program can be computed in step 460. The maximum number of registers can be computed by taking the maximum of the maximum number of registers required for each function, and incorporating the additional registers needed to handle calling conventions:

$$maximum\ registers_{Shader\ Program} = \left\lceil \bigvee_{Functions\ in\ Shader\ Program} maximum\ registers_{Function} + registers_{calling\ conventions} \right\rceil \quad \text{Eq. 6}$$

Figure 5:
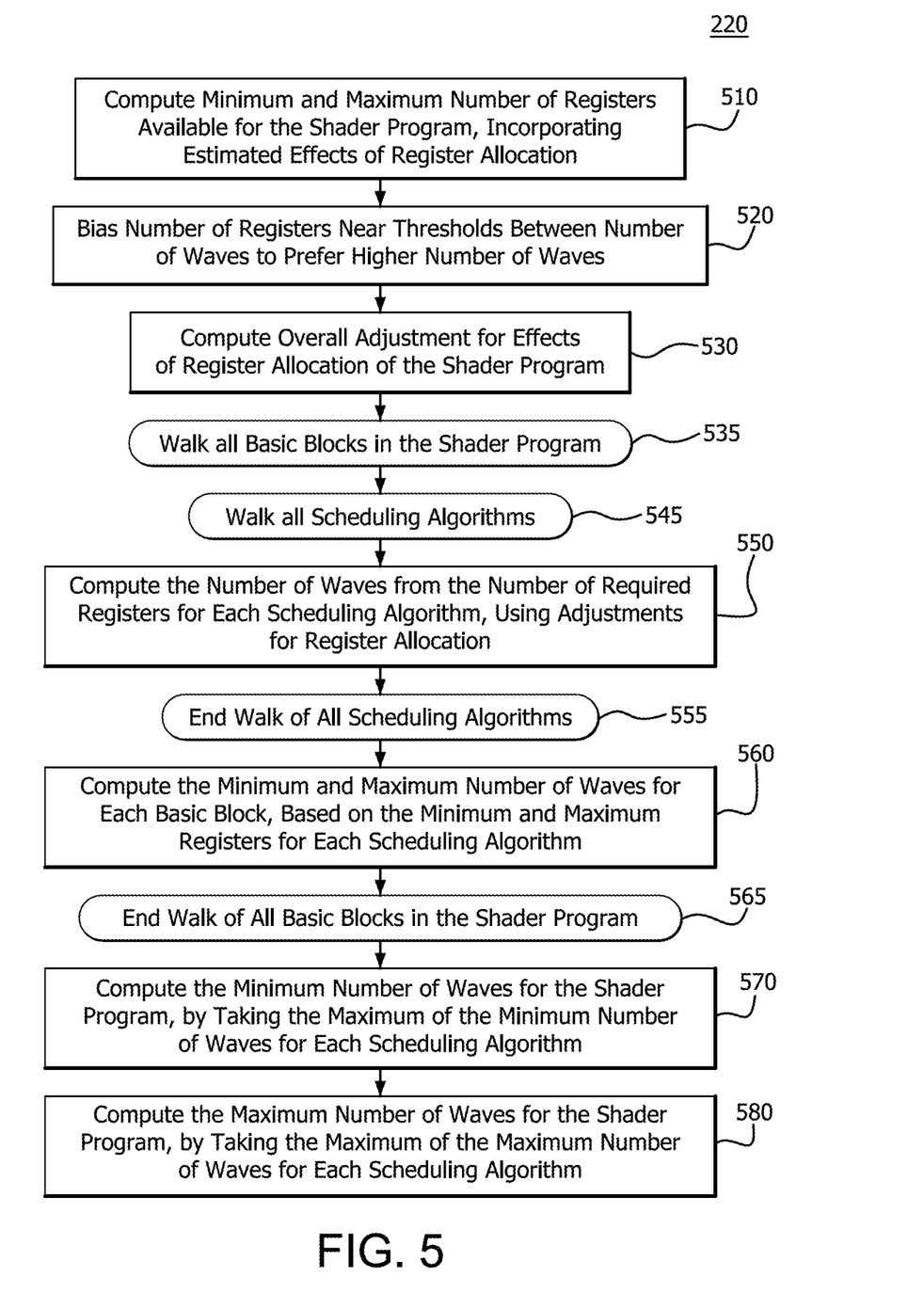
FIG. 5 is an illustration of a method for determining the range of number of waves of FIG. 2.

FIG. 5 is an illustration of a method for determining the range of number of waves as set forth in step 220 of FIG. 2. As set forth above, determining the range of number of waves at step 220 can apply any additional effects to the number of required registers from step 210, such as physical register usage, for example.

Step 220 can include computing the minimum and maximum number of registers available for the shader program by incorporating estimated effects of register allocation at step 510. At step 520, the number of registers can be biased near thresholds between the numbers of waves to prefer higher number of waves, for example. A computation over all adjustments for the effects of register allocation of the shader program can be performed at step 530. Determining 220 can apply the effects of register allocation on the number of required registers. Then when the number of registers is close to or over the number of registers for a specific count of waves, a trade-off can be explored by increasing the number of waves by decreasing the number of registers used.

At step 535 a walk-through of all basic blocks in the shader program can be performed. This can include applying all scheduling algorithms at step 545. A computation of the number of waves from the number of required registers for each scheduling algorithm using adjustments for register allocation can be performed at step 550. All blocks in the shader program are analyzed. For each block, the number of registers can be computed as needed for the effects of register allocation, and that number can be used to compute the number of waves available for each of the scheduling algorithms. The minimum number of waves for the block can be computed from the minimum of the number of waves for each scheduling algorithm:

$$\text{minimum waves}_{basic\ Block} = \lfloor V_{Scheduling\ Algorithms} \text{number of waves} \rfloor \quad \text{Eq. 7}$$

The maximum number of waves for the block can be computed from the maximum number of waves for each scheduling algorithm:

$$\text{maximum waves}_{Basic\ block} = \left\lceil \bigvee_{Scheduling\ Algorithms} \text{number of waves} \right\rceil \quad \text{Eq. 8}$$

The completion of the walking of all scheduling algorithms can occur at step 555.

A computation of the minimum and maximum number of waves for each basic block based on the minimum and maximum registers for each scheduling algorithm can be performed at step 560. The completion of the application of all basic blocks in the shader program can occur at step 565.

The minimum number of waves for the shader program can be computed at step 570. This minimum can be computed by taking the maximum of the minimum number of waves for each scheduling algorithm. For all basic blocks in the shader program, the minimum number of waves can be computed by:

$$\text{minimum waves}_{Shader\ Program} = \lfloor V_{Basic\ Blocks} \text{minimum waves} \rfloor \quad \text{Eq. 9}$$

The maximum number of waves for the shader program can be computed at step 580. This maximum can be computed by taking the maximum of the maximum number of waves for each scheduling algorithm. For all basic blocks in the shader program, the maximum number of waves can be computed by:

$$\text{maximum waves}_{Shader\ Program} = \lfloor V_{Basic\ Blocks} \text{maximum waves} \rfloor \quad \text{Eq. 10}$$

Figure 6:
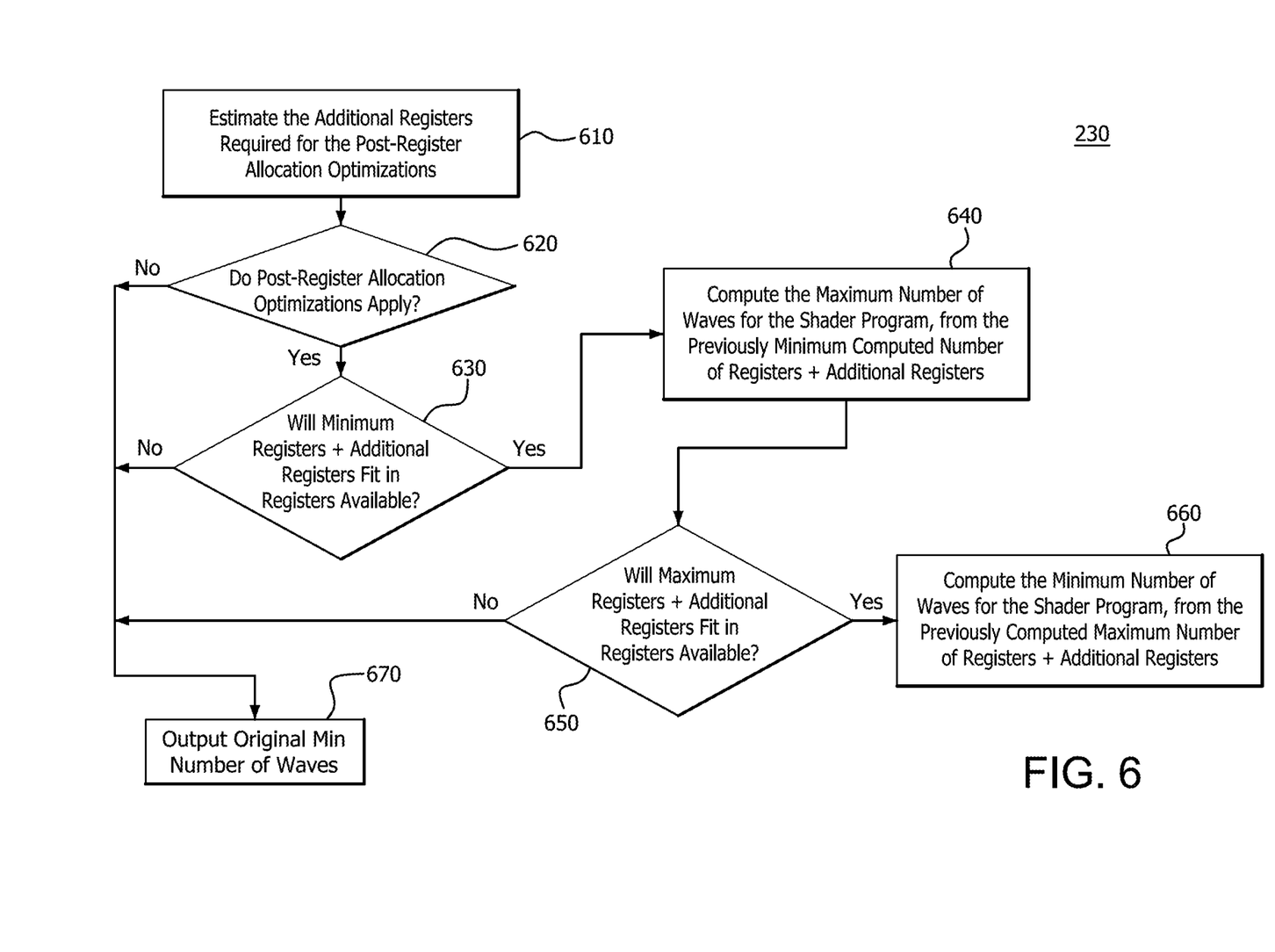
FIG. 6 is an illustration of a method for assessing the impact of post-register allocation optimizations of FIG. 2.

FIG. 6 is an illustration of a method for assessing the impact of post-register allocation optimizations as set forth in step 230 of FIG. 2. Assessing the impact of post-register allocation optimizations at step 230 can include estimating the number of registers required for the post-register allocation optimizations at step 610. Assessing at step 230 can include determining if there are post-register allocation optimizations that apply at step 620. If there are post-register allocation optimizations that apply, a determination if the minimum registers and additional registers fit in the registers available can be made at step 630. If the registers are a fit in step 630, a computation of the maximum number of waves for the shader program from the previous minimum computed number of registers and additional registers can be performed at step 640. This can be used as the maximum number of waves.

If the maximum number of registers added to the additional number of registers required for the post-register allocation optimization does not exceed the maximum number of registers available to the shader program at step 650, a computation of the minimum number of waves for the shader program from the computed maximum number of registers added to the additional number of registers required can be performed at step 660. This value is now used as the minimum number of waves.

If a determination is made that there are not post-register allocation optimizations that apply at step 620, if the registers do not fit in step 630, or if the maximum number of registers added to the additional number of registers required for the post-register allocation optimizations does exceed the maximum number of registers available to the shader program at step 650, then an output of the original minimum numbers of waves can occur at step 670.

Figure 7:
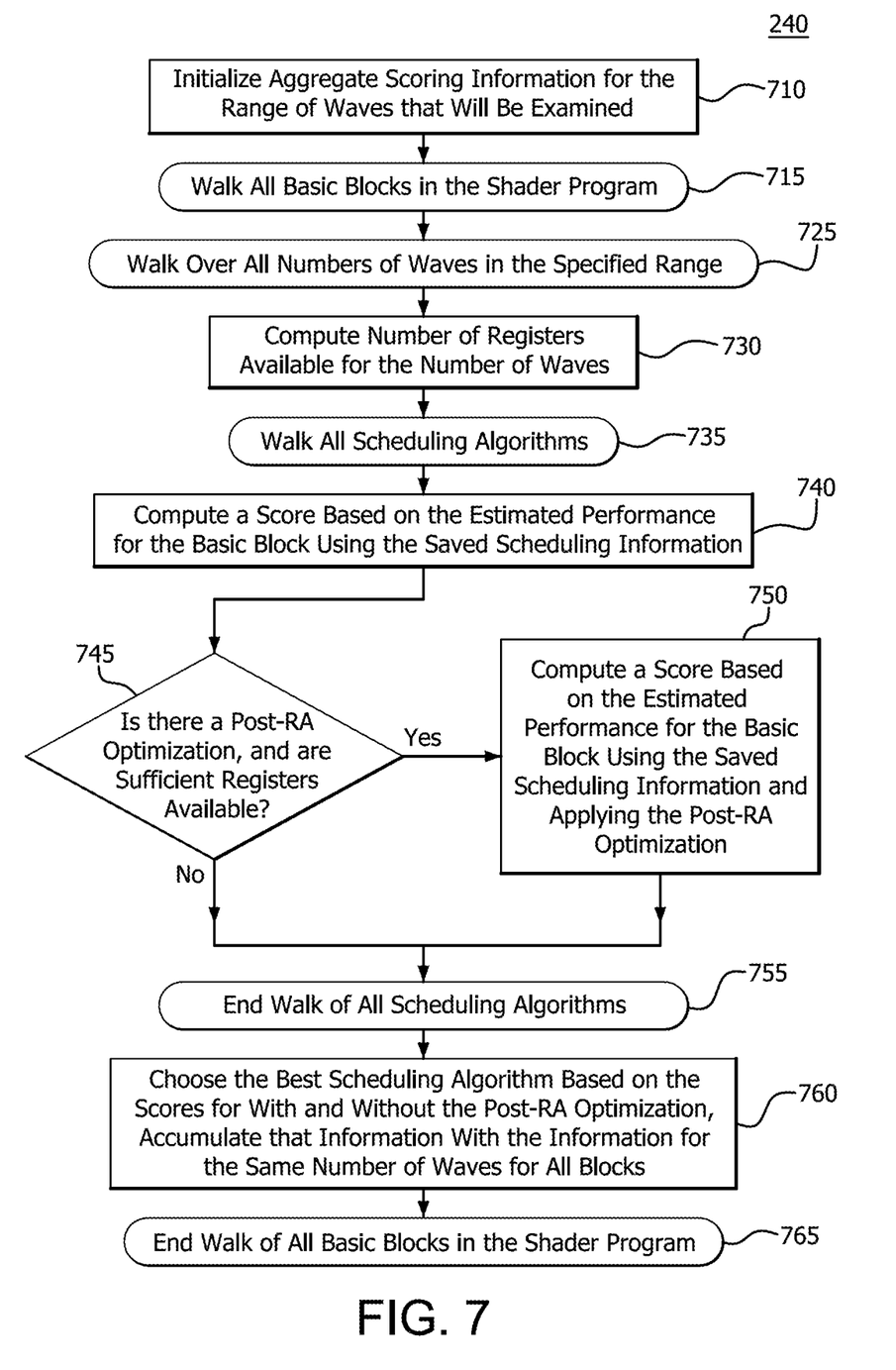
FIG. 7 is an illustration of a method for computing the scoring data for each number of waves of FIG. 2.

FIG. 7 is an illustration of a method for computing the scoring data for each number of waves as set forth in step 240 of FIG. 2. The scoring data for each number of waves at step 240 can be computed by walking each block in the shader program to accumulate the range of the minimum to maximum number of waves of the block's accumulated scoring data as examined for each scheduling algorithm.

Computing the scoring data for each number of waves at step 240 can include the underlying steps to take the number of waves and walk through the blocks and scheduling algorithms to output a score for each. This computation can include initializing aggregate scoring information for the range of waves that can be examined at step 710. Then walking of all basic blocks in the shader program can begin at step 715. This walking in step 715 can include walking overall numbers of waves in the specified range at step 725. This can include computing the number of registers available for the number of waves at step 730.

Walking through all of the scheduling algorithms can occur at step 735. This can include computing the score based on the estimated performance for the basic block using the saved scheduling information at step 740.

Step 745 can include a query to determine if there is a post-register allocation optimization and determine if sufficient registers are available. If step 745 is determined in the affirmative, i.e., sufficient registers exist, step 750 can compute a score for the number of waves based on the estimated performance for the basic block using the saved scheduling information and applying the post-register allocation optimization.

If step 745 is determined in the negative, i.e., sufficient registers are not available, or if step 750 has been completed, step 755 can include ending the walk of all scheduling algorithms.

The best scheduling algorithm can be chosen at step 760 based on the score with and without the post-register allocation optimization. These scores can be accumulated with the information for the same number of waves for all blocks. Step 765 can include ending the walk of all basic blocks in the shader program.

FIG. 8 is an illustration of a method for determining the number of waves as set forth in step 250 of FIG. 2. Determining the number of waves of step 250 can rely on the accumulated scoring information for the entire shader program for differing numbers of waves, and can incorporate the estimated impact of other optimizations. Determining the number of waves of step 250 can include a walk over all numbers of wave in the specified range at step 805. A score can be computed for the number of waves based on the accumulated data at step 810 for the shader program generated in step 240 described in more detail above with respect to FIG. 7. Step 815 can include a query to determine if there is a post-register allocation optimization and determine if sufficient registers are available. If step 815 is determined in the affirmative, i.e., sufficient registers exist, step 820 can compute a score for the number of waves based on the accumulated data incorporating the post-register allocation optimizations for the shader program generated in step 240 described in more detail above with respect to FIG. 7.

If step 815 is determined in the negative, i.e., sufficient registers are not available, or if step 820 has been completed, step 825 can include ending the walk of all scheduling algorithms. The number of waves can be chosen at step 830 based on the best score for the accumulated data for the number of waves and the best score for the accumulated data with post-register allocation optimizations. This choice can include a bias towards more waves, for example, because of an underlying preference to include more waves. So if scores are similar, the choice can select more waves even if that score is a slightly lower score. Step 840 can include computing the number of registers used by the shader program based on the number of waves chosen in step 830.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for scheduling instructions of a shader program for a graphics processing unit (GPU) with a fixed number of registers, the method comprising:
   computing, via a processing unit (PU), a first score for a computed number of waves based on data accumulated for the shader program;
   determining, via the PU, if the fixed number of registers are sufficient for the computed number of waves;
   based on the determining, computing, via the PU, a second score for the computed number of waves based on data accumulated and the fixed number of registers for the shader program;
   selecting the number of waves based on the first score and the second score;
   computing, via the PU, the number of registers from the fixed number of registers used by the shader program based on the selected number of waves; and
   executing the shader program by the GPU using the computed number of registers and the selected number of waves.

2. The method of claim 1, wherein the first score for a computed number of waves includes scoring data based on an assessed impact of available post-register allocation optimizations.

3. The method of claim 2, wherein computing the first score includes choosing a scheduling algorithm based on the scores including post-register allocation optimization and accumulates information with information for the number of waves of the registers for all blocks in the shader program.

4. The method of claim 1, wherein the second score for a computed number of waves includes scoring data based on an assessed impact of available post-register allocation optimizations.

5. The method of claim 4, wherein computing the second score includes choosing a scheduling algorithm based on the scores including post-register allocation optimization and accumulates information with information for the number of waves of the registers for all blocks in the shader program.

6. The method of claim 1, wherein the selected number of waves to execute for the computed number of registers used by the shader program is based on the computed first score.

7. The method of claim 6, wherein the computing the number of waves for the number of registers includes choosing the number of waves, based on a score for data accumulated for the number of waves, and the score for data accumulated with post-register allocation optimizations, and choosing the number of registers of the registers used by the shader program based on the number of waves chosen.

8. The method of claim 1, wherein the selected number of waves to execute for the number of registers used by the shader program is based on the computed second score.

9. The method of claim 8, wherein the computing the number of waves for the number of registers includes choosing the number of waves, based on a score for data accumulated for the number of waves, and the score for data accumulated with post-register allocation optimizations, and choosing the number of registers of the registers used by the shader program based on the number of waves chosen.

10. The method of claim 1, wherein the PU is one of a central processing unit (CPU) and a GPU.

11. A graphics processor with optimized scheduling of instructions of a shader program, the scheduling of instructions optimized by:
- computing, via a processing unit (PU), a first score for a computed number of waves based on the accumulated data for the shader program;
- determining, via the PU, if the fixed number of registers are sufficient for the computed number of waves;
- based on the determining, computing, via the PU, a second score for the computed number of waves based on the accumulated data and the fixed number of registers for the shader program;
- selecting the number of waves based on the first score and the second score;
- computing, via the PU, the number of registers from the fixed number of registers used by the shader program based on the selected number of waves; and
- executing the shader program by the GPU using the computed number of registers and the selected number of waves.

12. The graphics processor of claim 11, wherein the first score for a computed number of waves includes scoring data based on an assessed impact of available post-register allocation optimizations.

13. The graphics processor of claim 12, wherein computing the first score includes choosing a scheduling algorithm based on the scores including post-register allocation optimization and accumulates information with information for the number of waves of the registers for all blocks in the shader program.

14. The graphics processor of claim 11, wherein the second score for a computed number of waves includes scoring data based on an assessed impact of available post-register allocation optimizations.

15. The graphics processor of claim 14, wherein computing the second score includes choosing a scheduling algorithm based on the scores including post-register allocation optimization and accumulates information with information for the number of waves of the registers for all blocks in the shader program.

16. The graphics processor of claim 11, wherein the selected number of waves to execute for the computed number of registers used by the shader program based on the computed first score.

17. The graphics processor of claim 16, wherein the computing the number of waves for the number of registers includes choosing the number of waves, based on a score for data accumulated for the number of waves, and the score for data accumulated with post-register allocation optimizations, and choosing the number of registers of the registers used by the shader program based on the number of waves chosen.

18. The graphics processor of claim 11, wherein the selected number of waves to execute for the number of registers used by the shader program is based on the computed second score.

19. The graphics processor of claim 18, wherein the computing the number of waves for the number of registers includes choosing the number of waves, based on a score for data accumulated for the number of waves, and the score for data accumulated with post-register allocation optimizations, and choosing the number of registers of the registers used by the shader program based on the number of waves chosen.

20. The graphics processor of claim 11, wherein the PU is one of a central processing unit (CPU) and a GPU.

* * * * *